United States Patent
Airey et al.

(10) Patent No.: US 7,518,615 B1
(45) Date of Patent: Apr. 14, 2009

(54) DISPLAY SYSTEM HAVING FLOATING POINT RASTERIZATION AND FLOATING POINT FRAMEBUFFERING

(75) Inventors: John M. Airey, Mountain View, CA (US); Mark S. Peercy, Sunnyvale, CA (US); Robert A. Drebin, Palo Alto, CA (US); John Montrym, Los Altos, CA (US); David L. Dignam, Belmont, CA (US); Christopher J. Migdal, Mountain View, CA (US); Danny D. Loh, Fremont, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 0 days.

(21) Appl. No.: 09/614,363

(22) Filed: Jul. 12, 2000
(Under 37 CFR 1.47)

Related U.S. Application Data

(63) Continuation of application No. 09/098,041, filed on Jun. 16, 1998, now Pat. No. 6,650,327.

(51) Int. Cl.
*G06F 13/14* (2006.01)
*G06T 1/20* (2006.01)

(52) U.S. Cl. .................. 345/519; 345/546; 345/552; 345/611; 345/531; 345/543; 345/422; 345/502; 345/503; 345/506

(58) Field of Classification Search ............... 345/589, 345/592, 634, 586, 582, 581, 441, 501, 643, 345/419–428, 545, 531, 502–503; 708/204, 708/525

See application file for complete search history.

(56) References Cited

U.S. PATENT DOCUMENTS

| 4,866,637 | A |   | 9/1989 | Gonzalez-Lopez et al. .. 364/518 |
| 5,005,011 | A |   | 4/1991 | Perlman et al. ............. 340/728 |
| 5,307,450 | A |   | 4/1994 | Grossman ................... 395/123 |
| 5,392,393 | A | * | 2/1995 | Deering ...................... 345/505 |
| 5,440,682 | A | * | 8/1995 | Deering ...................... 345/503 |

(Continued)

FOREIGN PATENT DOCUMENTS

WO     WO 99/16021     4/1999

OTHER PUBLICATIONS

Co-pending U.S. Appl. No. 09/098,041.*

(Continued)

*Primary Examiner*—Jin-Cheng Wang
(74) *Attorney, Agent, or Firm*—Bromberg & Sunstein LLP

(57) ABSTRACT

A floating point rasterization and frame buffer in a computer system graphics program. The rasterization, fog, lighting, texturing, blending, and antialiasing processes operate on floating point values. In one embodiment, a 16-bit floating point format consisting of one sign bit, ten mantissa bits, and five exponent bits (s10e5), is used to optimize the range and precision afforded by the 16 available bits of information. In other embodiments, the floating point format can be defined in the manner preferred in order to achieve a desired range and precision of the data stored in the frame buffer. The final floating point values corresponding to pixel attributes are stored in a frame buffer and eventually read and drawn for display. The graphics program can operate directly on the data in the frame buffer without losing any of the desired range and precision of the data.

39 Claims, 7 Drawing Sheets

U.S. PATENT DOCUMENTS

| | | | | |
|---|---|---|---|---|
| 5,493,644 | A | * | 2/1996 | Thayer et al. ............... 345/531 |
| 5,517,611 | A | * | 5/1996 | Deering ...................... 345/503 |
| 5,528,741 | A | | 6/1996 | Lucas ......................... 395/131 |
| 5,542,032 | A | | 7/1996 | Pritt ............................ 395/121 |
| 5,696,944 | A | | 12/1997 | Krech, Jr. .................... 395/509 |
| 5,745,125 | A | | 4/1998 | Deering et al. |
| 5,844,571 | A | | 12/1998 | Narayanaswami |
| 5,862,066 | A | * | 1/1999 | Rossin et al. ................ 708/525 |
| 5,874,969 | A | * | 2/1999 | Storm et al. ................. 345/505 |
| 5,926,406 | A | | 7/1999 | Tucker et al. |
| 5,943,058 | A | | 8/1999 | Nagy .......................... 345/430 |
| 5,977,983 | A | | 11/1999 | Einkauf et al. .............. 345/430 |
| 5,995,121 | A | | 11/1999 | Alcorn et al. |
| 5,995,122 | A | | 11/1999 | Hsieh et al. |
| 6,046,746 | A | * | 4/2000 | Deering ...................... 345/422 |
| 6,049,343 | A | * | 4/2000 | Abe et al. .................... 345/501 |
| 6,061,782 | A | * | 5/2000 | Elliott et al. ................. 712/222 |
| 6,115,047 | A | * | 9/2000 | Deering ...................... 345/422 |
| 6,178,237 | B1 | * | 1/2001 | Horn ..................... 379/202.01 |
| 6,282,554 | B1 | * | 8/2001 | Abdallah et al. ............ 708/204 |
| 6,292,185 | B1 | | 9/2001 | Ko et al. ...................... 345/334 |
| 6,292,815 | B1 | * | 9/2001 | Abdallah et al. ............ 708/204 |
| 6,504,542 | B1 | * | 1/2003 | Voorhies et al. ............. 345/441 |
| 6,532,018 | B1 | * | 3/2003 | Chen et al. ................... 345/519 |
| 6,567,083 | B1 | * | 5/2003 | Baum et al. .................. 345/426 |
| 6,606,097 | B1 | * | 8/2003 | Fossum ....................... 345/501 |
| 6,650,327 | B1 | * | 11/2003 | Airey et al. .................. 345/520 |
| 6,756,978 | B1 | | 6/2004 | Chen et al. ................... 345/419 |
| 6,812,927 | B1 | | 11/2004 | Cutler et al. ................. 345/506 |

OTHER PUBLICATIONS

Marc Olano, "A Programmable Pipeline for Graphics Hardware", PhD Dissertation, Department of Computer Science, University of North Carolina, Chapel Hill, Apr. 1998.*

Lastra95 Anselmo Lastra, Steven Molnar, Marc Olano, Yulan Wang, Real-time programmable shading, Proceedings of the 1995 symposium on Interactive 3D graphics, p. 59-ff., Apr. 9-12, 1995, Monterey, California, United States.*

Marc Olano, Anselmo Lastra, A shading language on graphics hardware: the pixelflow shading system, Proceedings of the 25th annual conference on Computer graphics and interactive techniques, p. 159-168, Jul. 1998.*

Peercy, M.S. and Hesselink, L., "Dichromatic Color Representations for Complex Display Systems," *Proceedings Visualization '93*, IEEE Computer Society Press, pp. 212-219 and CP-21 (Oct. 25-29, 1993).

Peercy, M. et al., "Efficient Bump Mapping Hardware," *Computer Graphics Proceedings SIGGRAPH 97*, ACM, 4 pages (1997).

Peercy, M. S. et al., "Interactive Full Spectral Rendering," *Proceedings 1995 Symposium on Interactive 3D Graphics*, ACM, pp. 67, 68 and 207 (1995).

Peercy, M.S. et al., "Linear Color Representations for Efficient Image Synthesis," *Color research and application*, vol. 21, No. 2, Wiley-Interscience, pp. 129-137 (Apr. 1996).

Peercy, M. S., "Linear Color Representation for Full Spectral Rendering," *Proceedings of SIGGRAPH 20th Annual International Conference on Computer Graphics and Interactive Techniques*, ACM, pp. 191-198 (1993).

Peercy, M.S. and Hesselink, L., "Wavelength selection for color holography," *Practical Holography VIII*, vol. 2176, SPIE, pp. 108-118 (Feb. 7-9, 1994).

Peercy, M.S. and Hesselink, L., "Wavelength selection for true-color holography," *Applied Optics*, vol. 33, No. 29, Optical Society of America, pp. 6811-6817 (Oct. 10, 1994).

Larson, G.W. et al., "A Visibility Matching Tone Reproduction Operator for High Dynamic Range Scenes," *IEEE Transactions On Visualization and Computer Graphics*, vol. 3, No. 4, IEEE, pp. 291-306 (Oct.-Dec. 1997).

Larson, G. W., "LogLuv Encoding for Full-Gamut, High-Dynamic Range Images," *Journal of Graphics Tools*, vol. 3, No. 1, AK Peters, pp. 15-31 (Submitted to Journal on Aug. 26, 1998).

Larson, G.W. and Shakespeare, R., *Rendering with Radiance: The Art and Science of Lighting Visualization*, Morgan Kaufmann Publishers, Entire book submitted (1997).

Lastra, A. et al., "Real-Time Programmable Shading," *Proceedings of the 1995 Symposium on Interactive 3D Graphics*, ACM, pp. 59-66 (1995).

Olano, M. and Lastra, A., "A Shading Language on Graphics Hardware: The PixelFlow Shading System," *Proceedings of SIGGRAPH 98*, pp. 1-10 (Conference Dates: Jul. 19-24, 1998).

Rushmeier, H. et al., "Comparing Real and Synthetic Images: Some Ideas About Metrics," *Sixth Eurographics Workshop on Rendering*, Springer-Verlag, pp. 82-91 (Jun. 1995).

Rushmeier, H.E. and Ward, G.J., "Energy Preserving Non-Linear Filters," *Computer Graphics Proceedings, Annual Conference Series*, ACM, pp. 131-138 (Conference Dates: Jul. 24-29, 1994).

Ward, G., "A Contrast-Based Scalefactor for Luminance Display," *Graphics Gems IV*, Academic Press, Inc., pp. 415-421 (1994).

Ward, G.J. and Rubinstein, F.M., "A New Technique for Computer Simulation of Illuminated Spaces," *Journal of the Illuminating Engineering Society*, vol. 17, No. 1, The Illuminating Engineering Society, pp. 80-91 (Winter 1988).

Ward, G.J. et al., "A Ray Tracing Solution for Diffuse Interreflection," *Computer Graphics*, vol. 22, No. 4, ACM, pp. 85-92 (Aug. 1988).

Ward, G.J., "Adaptive Shadow Testing for Ray Tracing," *Proceedings of the 1991 Eurographics Rendering Workshop*, Springer-Verlag, pp. 11-20 (1991).

Ward, G.J. and Heckbert, P.S., "Irradiance Gradients," *Third Annual Eurographics Workshop on Rendering*, Springer-Verlag, pp. 85-98 (May 1992).

Ward, G.J., "Making global illumination user-friendly," *Sixth Eurographics Workshop on Rendering*, Springer-Verlag, pp. 104-114 (Jun. 1995).

Ward, G.J., "Measuring and Modeling Anisotropic Reflection," *Computer Graphics*, vol. 26, No. 2, ACM, pp. 265-272 (Jul. 1992).

Ward, G.J., "The Radiance Lighting Simulation and Rendering System," *Computer Graphics Proceedings, Annual Conference Series*, pp. 459-472 (Conference Dates: Jul. 24-29, 1994).

Ward, G.J., "Visualization," *LD+A (Lighting Design + Application)*, pp. 4-5 & 14-20 (Jun. 1990).

Foley, J., et al., *Computer Graphics: Principles and Practice*, 2nd Ed. in C, Addison-Wesley Publishing Company, Reading, Massachusetts, pp. xvii-xxiii, 165-179, 334-339, 806-814, and 855-922 (1996).

OpenGL® Architecture Review Board, OpenGL® Reference Manual: The Official Reference Document to OpenGL®, Version 1.1, 2nd Ed., Kempf, R., and Frazier, C., eds., Addison-Wesley Developers Press, Reading, Massachusetts, pp. iii-v and 1-24 (Jan. 1997).

Woo, M., et al., *OpenGL® Programming Guide: The Official Guide to Learning OpenGL®, Version 1.1*, 2nd Ed., Addison-Wesley Developers Press, Reading, Massachusetts, pp. v-xv, 10-14, 151-168, 277-305, and 373-394 (Jan. 1997).

Ward, et al., Plaintiff Silicon Graphics, Inc.'s Opening Claims Construction Brief, Aug. 7, 2007, 63 pages.

Jennifer L. Dereka, Declaration of Jennifer L. Dereka in Support of Plaintiff Silicon Graphics, Inc.'s Opening Claims Construction Brief, Aug. 7, 2007, 201 pages.

Barbara B. Crabb, District Judge, United States District Court for the Western District of Wisconsin, Opinion and Order, Aug. 20, 2007, 36 pages.

Ward, et al., Plaintiff Silicon Graphics, Inc.'s Rebuttal Claims Construction Brief, Aug. 21, 2007, 69 pages.

Jennifer L. Dereka, Declaration of Jennifer L. Dereka in Support of Plaintiff Silicon Graphics, Inc.'s Rebuttal Claims Construction Brief, Aug. 21, 2007, 58 pages.

Dr. Michael L. Gleicher, Declaration of Dr. Michael L. Gleicher in Support of Plaintiff Silicon Graphics, Inc.'s Rebuttal Claims Construction Brief, Aug. 21, 2007, 19 pages.

Ward, et al., Plaintiff Silicon Graphics, Inc.'s Supplemental Claims Construction Brief, Sep. 10, 2007, 29 pages.

Ward, et al., Plaintiff Silicon Graphics, Inc.'s Opposition to Defendants' Supplemental Claims Construction Brief, Sep. 17, 2007, 23 pages.

Barbara B. Crabb, District Judge, United States District Court for the Western District of Wisconsin, *Opinion and Order*, Oct. 15, 2007, 45 pages.
Ward, et al., Plaintiff Silicon Graphics, Inc.'s Proposed Post-Trial Jury Instructions, Jan. 24, 2008, 60 pages.
Barbara B. Crabb, District Judge, United States District Court for the Western District of Wisconsin, *Opinion and Order*, Jan. 30, 2008, 68 pages.
Manning, et al., Defendants' Motion in Limine to Exclude SGI from Arguing of Inferring that Claims 17, 18, 22 and 23 Require, High Speed or Specialized Graphics Hardware, Feb. 7, 2008, 4 pages.
Manning, et al., Defendants' Motion to Exclude Testimony and Argument that Claim 17 is Limited to the Order of Method Steps Recited in the Patent, Feb. 7, 2008, 5 pages.
Barbara B. Crabb, District Judge, United States District Court for the Western District of Wisconsin, *Order*, Feb. 15, 2008, 3 pages.
Peercy, Mark S., et al., *Interactive Multi-Pass Programmable Shading*, 1, 2003, 9 pages.
Pixar, *RenderMan Interface*, Version 3.1, Sep. 1989, 203 pages.
Silicon Graphics, Inc., The OpenGL Graphics System: A Specification (vol. 1.1), Mar. 4, 1997, 194 pages.
Barbara B. Crabb, District Judge, United States District Court for the Western District of Wisconsin, *Opinion and Order*, Aug. 1, 2008, 30 pages.
Olano, Marc et al., *A Shading Language on Graphics Hardware: The PixelFlow Shading System*, Proceedings of SIGGRAPH 98, Orlando, FL Jul. 19-24, 1998, 10 pages.
Kempf, Renate et al., Editors, *OpenGL Reference Manual: The Official Reference document to OpenGL, Version 1.1*/OpenGL Architecture Review Board, ® 1997 by Silicon Graphics, Inc., 2nd Ed., pp. 1-24.
Woo, Mason et al. *OpenGL Programming Guide: The Official Guide to Learning OpenGL, Version 1.1*, ® 1997 by Silicon Graphics, Inc., 2nd Ed., pp. v-xv, 10-14, 151-168, 277-305, 373-394.
Foley, James D. et al., *Computer Graphics: Principles and Practice*, Addison-Wesley Systems Programming Series, ® 1996, 1990 by Addison-Wesley Publishing Co., pp. 165-179, 334-339, 806-814, 855-922.
Olano, Marc, *A Programmable Pipeline for Graphics Hardware*, University of North Carolina at Chapel Hill dissertation, 1998.
Daniel W. Hildebrand, Joseph A. Ranney, Dewitt, Ross & Stevens, S.C., ATI Technologies ULC's Answer to Complaint for Patent Infringement, Dec. 1, 2006, 9 pages.
William H. Manning, Cole M. Fauver, Brian A. Mayer, Robins, Kaplan, Miller & Ciresi, L.L.P., ATI Technologies ULC's Answer and Counterclaim to Amended Complaint for Patent Infringement, Dec. 14, 2006, 13 pages.
Jeffrey S. Ward, Edward J. Pardon, Michael Best & Friedrich LLP, Plaintiff's Motion to Dismiss or Strike Counterclaims and Affirmative Defenses of Inequitable Conduct Pursuant to Fed. R. Civ. P. 12(b)(6), 12(f), and 9(b), or in the Alternative, for a More Definite Statement Pursuant to Fed. R. Civ. P. 12(e), Jan. 3, 2007, 12 pages.
Joseph A. Ranney, Dewitt Ross & Stevens, S.C., ATI Technologies' Opposition to Plaintiff's Motion to Dismiss or Strike Counterclaims and Affirmative Defenses of Inequitable Conduct Pursuant to Fed. R. Civ. P. 12(b)(6), 12(f) and 9(b), or in the Alternative, for a More Definite Statement Pursuant to Fed. R. Civ. P. 12(e), Jan. 22, 2007, 18 pages.
Brian A. Mayer, Robins, Kaplan, Miller & Ciresi L.L.P., Declaration of Brian A. Mayer in Support of ATI Technologies' Opposition to Plaintiff's Motion to Dismiss or Strike Counterclaims and Affirmative Defenses of Inequitable Conduct Pursuant to Fed. R. Civ. P. 12(b)(6). 12(f) and 9(b), or in the Alternative, for a More Definite Statement Pursuant to Fed. R. Civ. P. 12(e), Jan. 22, 2007, 62 pages.
Jeffrey S. Ward, Edward J. Pardon, Michael Best & Friedrich LLP, Plaintiff Silicon Graphics, Inc.'s Reply Memorandum in Support of its Converted Motion for Summary Judgment of Defendant's Counterclaim and Affirmative Defense of Inequitable Conduct, Feb. 2, 2007, 12 pages.
Joseph A. Ranney, Dewitt Ross & Stevens, S.C., Defendant's Memorandum in Support of Motion for Clarification and, in the Alternative, for a Rule 56(f) Continuance and An Order for Compliance with the Court's Written Summary Judgment Procedures, Feb. 12, 2007, 7 pages.
William H. Manning, Cole M. Fauver, Brian A. Mayer, Robins, Kaplan, Miller & Ciresi L.L.P., ATI Technologies ULC's Memorandum of Law in Support of its Partial Motion to Dismiss for Lack of Standing, Mar. 1, 2007, 15 pages.
William H. Manning, Cole M. Fauver, Brian A. Mayer, Robins, Kaplan, Miller & Ciresi L.L.P., ATI Technologies ULC's Brief in Support of its Motion for Summary Judgment of Noninfringement of U.S. Patent Nos. 6,650,327, 6,292,200 and 6,885,376, Mar. 8, 2007, 42 pages.
Eric Demers, Declaration of Eric Demers in Support of ATI Technologies ULC's Motion for Summary Judgment of Noninfringement of U.S. Patents Nos. 6,650,327, 6,292,200 and 6,885,376, Mar. 8, 2007, 7 pages.
Brian A. Mayer, Robins, Kaplan, Miller & Ciresi L.L.P., Declaration of Brian A. Mayer in Support of ATI Technologies ULC's Motion for Summary Judgment of Noninfringement, Mar. 8, 2007, 191 pages.
Barbara B. Crabb, District Judge, United States District Court for the Western District of Wisconsin, *Opinion and Order*, Mar. 16, 2007, 10 pages.
Phillip L. Hirschhorn, Morgan, Lewis & Bockius LLP, Plaintiff Silicon Graphics, Inc.'s Memorandum in Opposition to Defendant's Infringement Claims Under U.S. Patent Nos. 6,650,327 and 6,292,200, Mar. 26, 2007, 28 pages.
Phillip L. Hirschhorn, Morgan, Lewis & Bockius LLP, Silicon Graphics, Inc.'s Reply to ATI Technologies ULC's Answer and Counterclaim to Amended Complaint for Patent Infringement and Counterclaims Against ATI Technologies ULC and Advanced Micro Devices, Inc., Mar. 30, 2007, 14 pages.
Dr. Andrew Wolfe, Declaration of Dr. Andrew Wolfe in Support of ATI Technologies ULC's Opposition to Plaintiff Silicon Graphics, Inc's Motion Pursuant to Rule 56(f), Apr. 11, 2007, 18 pages.
Molnar, Steven, *The PixelFlow Texture and Image Subsystem*, University of North Carolina-Chapel Hill, Apr. 1995, 11 pages.
Eyles, John et al., *PixelFlow, The Realization*, 1997, 13 pages.
Olano, Marc et al., *Procedural Primitives in a High Performance, Hardware Accelerated, Z-Buffer Renderer*, University of North Carolina-Chapel Hill, 1997, 10 pages.
Fuchs, *Supercomputing Power for Interactive Visualization, PixelFlow Progress Report*, University of North Carolina-Chapel Hill, Apr. 1995, 62 pages.
Piol, Alessandro, *Parallel Processing for Image Computing*, Multiprocessors and Array Processors. 1988, pp. 91-93.
Borden, Bruce, *Graphics Processing on a Graphics Supercomputer*, IEEE Computer Graphics & Applications, Jul. 1989, pp. 56-62.
Ward, greg, *Real Pixels*, Graphic Gems II, Academic Press, Inc., 1991, pp. 80-83.
Wilkes, Maurice, *Arithmetic on the EDSAC*, IEEE Annals of the History of Computing, vol. 19, No. 1, 1997, pp. 13-15.
Wah, Chan Choong, *Design of a Gate Array Matrix Processor*, IEEE Tencon 1993, Beijing, pp. 565-568.
*Mechanism to Clamp and Pack Lit Floating-Point Colors*, IBM Technical Disclosure Bulletin, vol. 40, No. 3, Mar. 1997, pp. 163-164.
Akeley, Kurt et al., *High-Performance Polygon Rendering*, Computer Graphics, vol. 22, No. 4, Aug. 1988, pp. 239-246.
Lee, John A.N., *Howard Aiken's Third Machine: The Harvard Mark III Calculator or Aiken-Dahlgren Electronic Calculator*, IEEE Annals of the History of Computing, vol. 22, No. 1, Jan.-Mar. 2006, pp. 62-81.
Cross, Robert A., *Interactive Realism for Visualization Using Ray Tracing*, Proceedings of Visualization '95, Oct. 29-Nov. 3, 1995, IEEE Computer Society Press, pp. 19-26.
Rojas, Raul, *Konrad Zuse's Legacy: The Architecture of the Z1 and Z3*, IEEE Annuals of the History of Computing, vol. 19, No. 2, 1997, pp. 5-16.
*TMS34020. TMS34020A Graphics Processors* (Data Sheet), Texas Instruments, 1993, pp. 1-81.
Eyles, John et al., *PixelFlow™ Rasterizer Functional Description*, University of North Carolina at Chapel Hill, Nov. 20, 1997, pp. 1-105.

Burks, Arthur W. et al., *Preliminary Discussion of the Logical Design of an Electronic Computing Instrument*, Papers of John von Newmann on Computing and Computer Theory. The MIT Press, 1987, pp. 97-142.

Miranker, G.S., *Titan III Supercomputer Architectural Overview*, Computing 48, 1992, pp. 39-59.

Potmesil, Michael et al., *The Pixel Machine: A Parallel Image Computer*, Computer Graphics vol. 23, No. 3, Jul. 1989, pp. 69-78.

Diede, Tom et al., *The Titan Graphics Supercomputer Architecture*, Computer. Sep. 1988, pp. 13-30.

William H. Manning, Cole M. Fauver, Brian A. Mayer, Robins, Kaplan, Miller & Ciresi L.L.P., Supplemental Answers to Plaintiff Silicon Graphics, Inc.'s First Set of Interrogatories to Defendant ATI Technologies, ULC (Nos. 2-3), Jan. 18, 2007, 63 pages.

Manning, et al., *Brief of Appellants*, Oct. 28, 2008, 151 pages.

Bollinger, et al., *Brief for Plaintiff-Cross Appellant*, Dec. 10, 2008, 265 pages.

* cited by examiner

| VALUE | CONDITIONS** |
|---|---|
| $(-1)^s \times 2^{(e-16)} \times 1.m$ | 00000<e<11111 |
| $(-1)^s \times 2^{15} \times 1.m$ | e==11111, m!=1111111111 |
| $(-1)^s \times 2^{-16} \times 1.m$ | e==00000, m!=0000000000 |
| zero | e==00000, s==0, m==0000000000 |
| NaN* | e==00000, s==1, m==0000000000 |
| positive infinity | e==11111, s==0, m==1111111111 |
| negative infinity | e==11111, s==1, m==1111111111 |

\* NaN: "Not a number," which is generated as the result of an invalid operation and also represents the concept of "negative zero"

\*\* Extrapolation to s11e5 is readily achievable

FIG. 3

DISPLAY SYSTEM HAVING FLOATING POINT RASTERIZATION AND FLOATING POINT FRAMEBUFFERING

This is a continuation of application Ser. No. 09/098,041 filed on Jun. 16, 1998 now U.S. Pat. No. 6,650,327.

TECHNICAL FIELD

This invention relates to the field of computer graphics. Specifically, the present invention pertains to an apparatus and process relating to floating point rasterization and frame buffering in a graphics display system.

BACKGROUND ART

Graphics software programs are well known in the art. A graphics program consists of commands used to specify the operations needed to produce interactive three-dimensional images. It can be envisioned as a pipeline through which data pass, where the data are used to define the image to be produced and displayed. The user issues a command through the central processing unit of a computer system, and the command is implemented by the graphics program. At various points along the pipeline, various operations specified by the user's commands are carried out, and the data are modified accordingly. In the initial stages of the pipeline, the desired image is framed using geometric shapes such as lines and polygons (usually triangles), referred to in the art as "primitives." The vertices of these primitives define a crude shell of the objects in the scene to be rendered. The derivation and manipulation of the multitudes of vertices in a given scene, entail performing many geometric calculations.

In the next stages, a scan conversion process is performed to specify which picture elements or "pixels" of the display screen, belong to which of the primitives. Many times, portions or "fragments" of a pixel fall into two or more different primitives. Hence, the more sophisticated computer systems process pixels on a per fragment basis. These fragments are assigned attributes such as color, perspective (i.e., depth), and texture. In order to provide even better quality images, effects such as lighting, fog, and shading are added. Furthermore, anti-aliasing and blending functions are used to give the picture a smoother and more realistic appearance. The processes pertaining to scan converting, assigning colors, depth buffering, texturing, lighting, and anti-aliasing are collectively known as rasterization. Today's computer systems often contain specially designed rasterization hardware to accelerate 3-D graphics.

In the final stage, the pixel attributes are stored in a frame buffer memory. Eventually, these pixel values are read from the frame buffer and used to draw the three-dimensional images on the computer screen. One prior art example of a computer architecture which has been successfully used to build 3-D computer imaging systems is the Open GL architecture invented by Silicon Graphics, Inc. of Mountain View, Calif.

Currently, many of the less expensive computer systems use its microprocessor to perform the geometric calculations. The microprocessor contains a unit which performs simple arithmetic functions, such as add and multiply. These arithmetic functions are typically performed in a floating point notation. Basically, in a floating point format, data is represented by the product of a fraction, or mantissa, and a number raised to an exponent; in base 10, for example, the number "n" can be presented by $n = m \times 10^e$, where "m" is the mantissa and "e" is the exponent. Hence, the decimal point is allowed to "float." Hence, the unit within the microprocessor for performing arithmetic functions is commonly referred to as the "floating point unit." This same floating point unit can be used in executing normal microprocessor instructions as well as in performing geometric calculations in support of the rendering process. In order to increase the speed and increase graphics generation capability, some computer systems utilize a specialized geometry engine, which is dedicated to performing nothing but geometric calculations. These geometry engines have taken to handling its calculations on a floating point basis.

Likewise, special hardware have evolved to accelerate the rasterization process. However, the rasterization has been done in a fixed point format rather than a floating point format. In a fixed point format, the location of the decimal point within the data field for a fixed point format is specified and fixed; there is no exponent. The main reason why rasterization is performed on a fixed point format is because it is much easier to implement fixed point operations in hardware. For a given set of operations, a fixed point format requires less logic and circuits to implement in comparison to that of a floating point format. In short, the floating point format permits greater flexibility and accuracy when operating on the data in the pipeline, but requires greater computational resources. Furthermore, fixed point calculations can be executed much faster than an equivalent floating point calculation. As such, the extra computational expenses and time associated with having a floating point rasterization process has been prohibitive when weighed against the advantages conferred.

In an effort to gain the advantages conferred by operating on a floating point basis, some prior art systems have attempted to perform floating point through software emulation, but on a fixed point hardware platform. However, this approach is extremely slow, due to the fact that the software emulation relies upon the use of a general purpose CPU. Furthermore, the prior art software emulation approach lacked a floating point frame buffer and could not be scanned out. Hence, the final result must be converted back to a fixed point format before being drawn for display. Some examples of floating point software emulation on a fixed point hardware platform include Pixar's RenderMan software and software described in the following publications: Olano, Marc and Anselmo Lastra, "A Shading Language on Graphics Hardware: The PixelFlow Shading System," Proceedings of SIGGRAPH 98, *Computer Graphics*, Annual Conference Series, ACM SIGGRAPH, 1998; and Anselmo Lastra, Steve Molnar, Marc Olano, and Yulan Wang, "Real-Time Programmable Shading," Proceedings of the 1995 Symposium of Interactive 3D Graphics (Monterey, Calif., Apr. 9-12, 1995), ACM SIGGRAPH, New York, 1995.

But as advances in semiconductor and computer technology enable greater processing power and faster speeds; as prices drop; and as graphical applications grow in sophistication and precision, it has been discovered by the present inventors that it is now practical to implement some portions or even the entire rasterization process by hardware in a floating point format.

In addition, in the prior art, data is stored in the frame buffer in a fixed point format. This practice was considered acceptable because the accuracy provided by the fixed point format was considered satisfactory for storage purposes. Other considerations in the prior art were the cost of hardware (e.g., memory chips) and the amount of actual physical space available in a computer system, both of which limited the number of chips that could be used and thus, limited the memory available. Thus, in the prior art, it was not cost beneficial to expand the memory needed for the frame buffer because it was not necessary to increase the accuracy of the data stored therein.

Yet, as memory chips become less expensive, the capability of a computer system to store greater amounts of data increases while remaining cost beneficial. Thus, as memory capacity increases and becomes less expensive, software applications can grow in complexity; and as the complexity of the software increases, hardware and software designs are improved to increase the speed at which the software programs can be run. Hence, due to the improvements in processor speed and other improvements that make it practical to operate on large amounts of data, it is now possible and cost beneficial to utilize the valuable information that can be provided by the frame buffer.

Also, it is preferable to operate directly on the data stored in the frame buffer. Operating directly on the frame buffer data is preferable because it allows changes to be made to the frame buffer data without having to unnecessarily repeat some of the preceding steps in the graphics pipeline. The information stored in the frame buffer is a rich source of data that can be used in subsequent graphics calculations. However, in the prior art, some steps typically need to be repeated to restore the accuracy of the data and allow it to be operated on before it is read back into the frame buffer. In other words, data would need to be read from the frame buffer and input into the graphics program at or near the beginning of the program, so that the data could be recalculated in the floating point format to restore the required precision and range. Thus, a disadvantage to the prior art is that additional steps are necessary to allow direct operation on the frame buffer data, thus increasing the processing time. This in turn can limit other applications of the graphics program; for example, in an image processing application, an image operated on by the graphics program and stored in the frame buffer could be subsequently enhanced through direct operation on the frame buffer data. However, in the prior art, the accuracy necessary to portray the desired detail of the image is lost, or else the accuracy would have to be regenerated by repeated passes through the graphics pipeline.

Another drawback to the prior art is the limited ability to take advantage of hardware design improvements that could be otherwise employed, if direct operation on the frame buffer without the disadvantages identified above was possible. For example, a computer system could be designed with processors dedicated to operating on the frame buffer, resulting in additional improvements in the speed at which graphics calculations are performed.

Consequently, the use of fixed point formatting in the frame buffer is a drawback in the prior art because of the limitations imposed on the range and precision of the data stored in the frame buffer. The range of data in the prior art is limited to 0 to 1, and calculation results that are outside this range must be set equal to either 0 or 1, referred to in the art as "clamping." Also, the prior art does not permit small enough values to be stored, resulting in a loss of precision because smaller values must be rounded off to the smallest value that can be stored. Thus, the accuracy of the data calculated in the graphics pipeline is lost when it is stored in the frame buffer. Moreover, in the prior art, the results that are calculated by operating directly on the data in the frame buffer are not as accurate as they can and need to be. Therefore, a drawback to the prior art is that the user cannot exercise sufficient control over the quality of the frame buffer data in subsequent operations.

Thus, there is a need for a graphical display system which predominately uses floating point throughout the entire geometry, rasterization, and frame buffering processes. The present invention provides one such display system. Furthermore, the display system of the present invention is designed to be compatible to a practical extent with existing computer systems and graphics subsystems.

SUMMARY OF THE INVENTION

The present invention provides a display system and process whereby the geometry, rasterization, and frame buffer predominately operate on a floating point format. Vertex information associated with geometric calculations are specified in a floating point format. Attributes associated with pixels and fragments are defined in a floating point format. In particular, all color values exist as floating point format. Furthermore, certain rasterization processes are performed according to a floating point format. Specifically, the scan conversion process is now handled entirely on a floating point basis. Texturing, fog, and antialiasing all operate on floating point numbers. The texture map stores floating point texel values. The resulting data are read from, operated on, written to and stored in the frame buffer using floating point formats, thereby enabling subsequent graphics operations to be performed directly on the frame buffer data without any loss of accuracy.

Many different types of floating point formats exist and can be used to practice the present invention. However, it has been discovered that one floating point format, known as "s10e5," has been found to be particularly optimal when applied to various aspects of graphical computations. As such, it is used extensively throughout the geometric, rasterization, and frame buffer processes of the present invention. To optimize the range and precision of the data in the geometry, rasterization, and frame buffer processes, this particular s10e5 floating point format imposes a 16-bit format which provides one sign bit, ten mantissa bits, and five exponent bits. In another embodiment, a 17-bit floating point format designated as "s11e5" is specified to maintain consistency and ease of use with applications that use 12 bits of mantissa. Other formats may be used in accordance with the present invention depending on the application and the desired range and precision.

BRIEF DESCRIPTION OF THE DRAWINGS

FIG. 3 is a tabulation of the representative values for all possible bit combinations used in the preferred embodiment of the present invention.

FIG. 5, which spans

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

Figure 1:
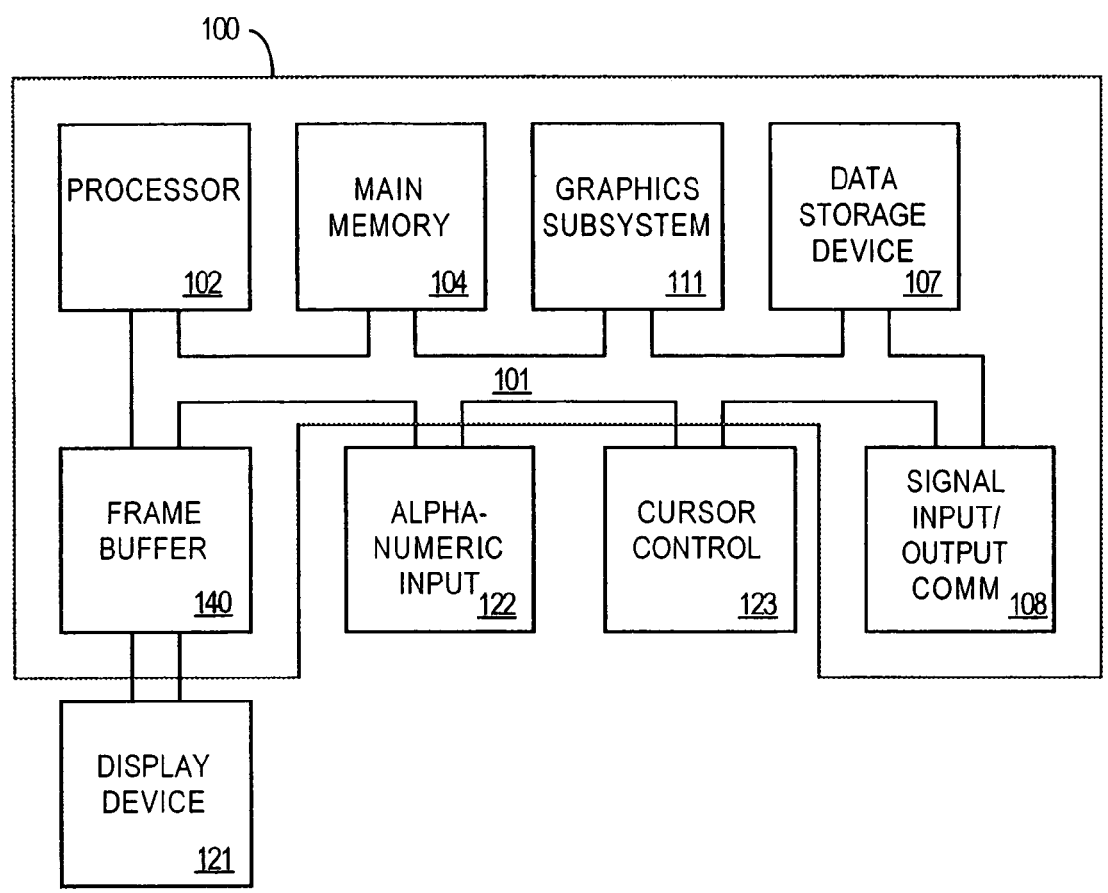
FIG. 1 shows a computer graphics system upon which the present invention may be practiced.

Referring to FIG. 1, a computer graphics system upon which the present invention may be practiced is shown as 100. System 100 can include any computer-controlled graphics systems for generating complex or three-dimensional images. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Data storage device 107 is coupled to bus 101 for storing information and instructions. Furthermore, an input/output (I/O) device 108 is used to couple the computer system 100 onto a network.

Computer system 100 can also be coupled via bus 101 to an alphanumeric input device 122, including alphanumeric and other keys, that is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Also coupled to bus 101 is a graphics subsystem 111. Processor 102 provides the graphics subsystem 111 with graphics data such as drawing commands, coordinate vertex data, and other data related to an object's geometric position, color, and surface parameters. The object data are processed by graphics subsystem 111 in the following four pipelined stages: geometry subsystem, scan conversion subsystem, raster subsystem, and a display subsystem. The geometry subsystem converts the graphical data from processor 102 into a screen coordinate system. The scan conversion subsystem then generates pixel data based on the primitives (e.g., points, lines, polygons, and meshes) from the geometry subsystem. The pixel data are sent to the raster subsystem, whereupon z-buffering, blending, texturing, and anti-aliasing functions are performed. The resulting pixel values are stored in a frame buffer 130. The display subsystem reads the frame buffer and displays the image on display monitor 121.

Figure 2:
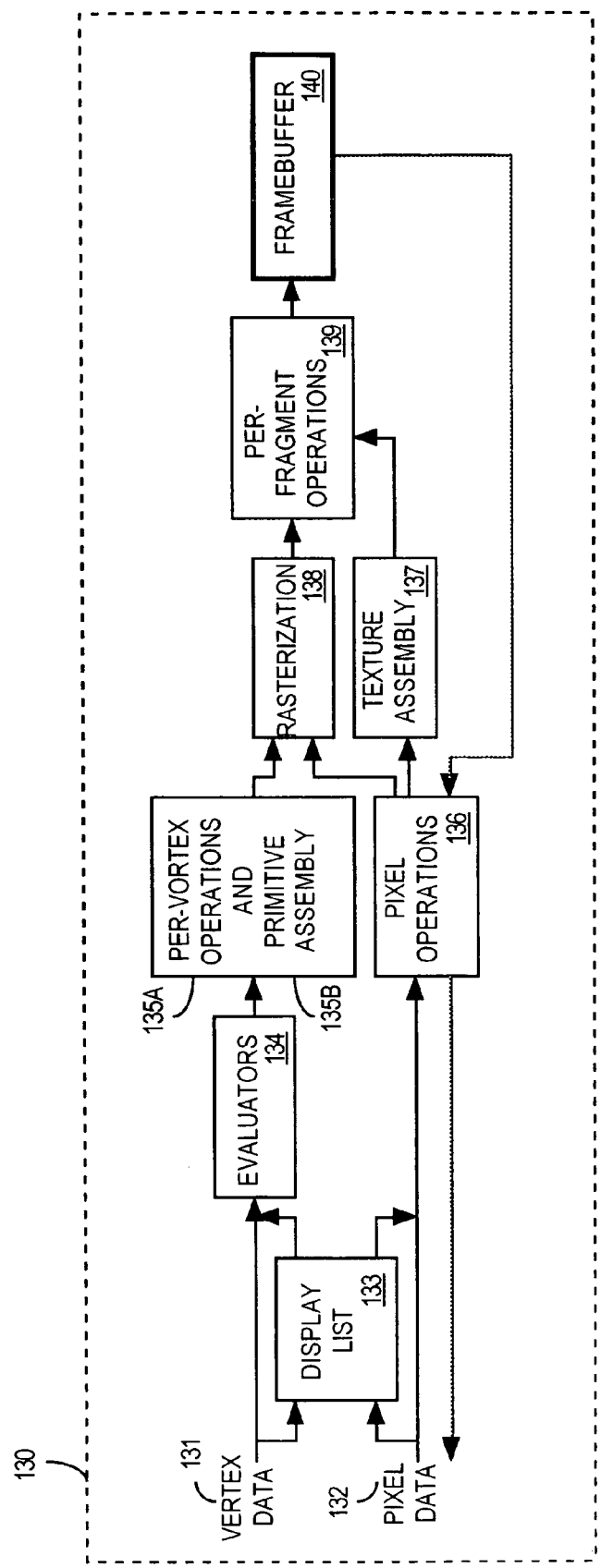
FIG. 2 is a flow chart illustrating the stages for processing data in a graphics program in accordance with the present invention.

With reference now to FIG. 2, a series of steps for processing and operating on data in the graphics subsystem 111 of FIG. 1 are shown. The graphics program 130, also referred to in the art as a state machine or a rendering pipeline, provides a software interface that enables the user to produce interactive three-dimensional applications on different computer systems and processors. The graphics program 130 is exemplified by a system such as OpenGL by Silicon Graphics; however, it is appreciated that the graphics program 130 is exemplary only, and that the present invention can operate within a number of different graphics systems or state machines other than OpenGL.

With reference still to FIG. 2, graphics program 130 operates on both vertex (or geometric) data 131 and pixel (or image) data 132. The process steps within the graphics program 130 consist of the display list 133, evaluators 134, per-vertex operations and primitive assembly 135, pixel operations 136, texture assembly 137, rasterization 138, per-fragment operations 139, and the frame buffer 140.

Vertex data 131 and pixel data 132 are loaded from the memory of central processor 102 and saved in a display list 133. When the display list 133 is executed, the evaluators 134 derive the coordinates, or vertices, that are used to describe points, lines, polygons, and the like, referred to in the art as "primitives." From this point in the process, vertex data and pixel data follow a different route through the graphics program as shown in FIG. 2.

In the per-vertex operations 135A, vertex data 131 are converted into primitives that are assembled to represent the surfaces to be graphically displayed. Depending on the programming, advanced features such as lighting calculations may also be performed at the per-vertex operations stage. The primitive assembly 135B then eliminates unnecessary portions of the primitives and adds characteristics such as perspective, texture, color and depth.

In pixel operations 136, pixel data may be read from the processor 102 or the frame buffer 140. A pixel map processes the data from the processor to add scaling, for example, and the results are then either written into texture assembly 137 or sent to the rasterization step 138. Pixel data read from the frame buffer 140 are similarly processed within pixel operations 136. There are special pixel operations to copy data in the frame buffer to other parts of the frame buffer or to texture memory. A single pass is made through the pixel operations before the data are written to the texture memory or back to the frame buffer. Additional single passes may be subsequently made as needed to operate on the data until the desired graphics display is realized.

Texture assembly 137 applies texture images—for example, wood grain to a table top—onto the surfaces that are to be graphically displayed. Texture image data are specified from frame buffer memory as well as from processor 102 memory.

Rasterization 138 is the conversion of vertex and pixel data into "fragments." Each fragment corresponds to a single pixel and typically includes data defining color, depth, and texture. Thus, for a single fragment, there are typically multiple pieces of data defining that fragment.

Per-fragment operations 139 consist of additional operations that may be enabled to enhance the detail of the fragments. After completion of these operations, the processing of the fragment is complete and it is written as a pixel to the frame buffer 140. Thus, there are typically multiple pieces of data defining each pixel.

With reference still to FIG. 2, the present invention uses floating point formats in the process steps 131 through 139 of graphics program 130. In other words, the vertex data is given in floating point. Likewise, the pixel data is also given in floating point. The display list 133 and evaluators 134 both operate on floating point values. All pixel operations in block 136 are performed according to a floating point format. Similarly, per-vertex operations and primitive assembly 135A are performed on a floating point format. The rasterization 138 is performed according to a floating point format. In addition, texturing 137 is done on floating point basis, and the texture values are stored in the texture memory as floating point. All per-fragment operations are performed on a floating point basis. Lastly, the resulting floating point values are stored in the frame buffer 140. Thereby, the user can operate directly on the frame buffer data.

For example, the maximum value that can be used in the 8-bit fixed point format is 127 (i.e., $2^8-1$), which is written as 01111111 in binary, where the first digit represents the sign (positive or negative) and the remaining seven digits represent the number 127 in binary. In the prior art, this value is clamped and stored as 1.0 in the frame buffer. In an 8-bit floating point format, a value "n" is represented by the format n=s_eee_mmmmm, where "s" represents the sign, "e" represents the exponent, and "m" represents the mantissa in the binary formula $n=m\times2^e$. Thus, in a floating point format, the largest number that can be written is $31\times2^7$, also written in binary as 01111111. In the present invention, the value is written to and stored in the frame buffer without being clamped or otherwise changed. Thus, use of the floating point format in the frame buffer permits greater flexibility in how a number can be represented, and allows for a larger range of values to be represented by virtue of the use of a portion of the data field to specify an exponent.

The present invention uses floating point formats in the frame buffer to increase the range of the data. "Range" is used herein to mean the distance between the most negative value and the most positive value of the data that can be stored. The present invention permits absolute values much greater than 1.0 to be stored in the frame buffer, thereby enabling the user to generate a greater variety of graphics images. Increased range is particularly advantageous when the user performs operations such as addition, multiplication, or other operations well known and practiced in the art, directly on the data in the frame buffer. Such operations can result in values greater than 1.0, and in the present invention these values can be written to and stored in the frame buffer without clamping. Thus, the present invention results in a substantial increase in the range of data that can be stored in the frame buffer, and preserves the range of data that was determined in steps 131 through 139 of the graphics program illustrated in FIG. 2.

With reference still to FIG. 2, the present invention utilizes floating point formats in the frame buffer 140 to maintain the precision of the data calculated in the preceding steps 131 through 139 of the graphics program 130. "Precision" is used herein to mean the increment between any two consecutive stored values of data. Precision is established by the smallest increment that can be written in the format being used. Increased precision is an important characteristic that permits the present invention to store a greater number of gradations of data relative to the prior art, thereby providing the user with a greater degree of control over the graphics images to be displayed. This characteristic is particularly advantageous when the user performs an operation such as addition, multiplication, or other operations well known and practiced in the art, on the data in the frame buffer. Such operations can result in values that lie close to each other, i.e., data that are approximately but not equal to each other. In the present invention, data typically can be stored without having to be rounded to a value permitted by the precision of the frame buffer. If rounding is needed, the present invention permits the data to be rounded to a value very close to the calculated values. Thus, the present invention results in a substantial increase in the precision of the data that can be stored in the frame buffer relative to the prior art, and preserves the precision of the data that was determined in steps 131 through 139 of the graphics program illustrated in FIG. 2.

In one embodiment of the present invention, a 16-bit floating point format is utilized in the frame buffer. The 16 bits available are applied so as to optimize the balance between range and precision. The 16-bit floating point format utilized in one embodiment of the present invention is designated using the nomenclature "s10e5", where "s" specifies one (1) sign bit, "10" specifies ten (10) mantissa bits, and "e5" specifies five (5) exponent bits, with an exponent bias of 16. FIG. 3 defines the represented values for all possible bit combinations for the s10e5 format. In this embodiment, the smallest representable number (i.e., precision) is 1.0000_0000_00*$2^{-16}$ and the range is plus/minus 1.1111_1111_10*$2^{15}$. (In base 10, the range corresponds to approximately plus/minus 65,000.) In this embodiment, the range and precision provided by this specification are sufficient for operating directly on the frame buffer. The 16-bit format in this embodiment thus represents a cost-effective alternative to the single precision 32-bit IEEE floating point standard.

However, it is appreciated that different sizes other than 16-bit, such as 12-bit, 17-bit or 32-bit, can be used in accordance with the present invention. In addition, other floating point formats may be used in accordance with the present invention by varying the number of bits assigned to the mantissa and to the exponent (a sign bit is typically but not always needed). Thus a floating point format can be specified in accordance with the present invention that results in the desired range and precision. For example, if the format specified is "s9e6" (nine mantissa bits and six exponent bits), then relative to the s10e5 format a greater range of data is defined but the precision is reduced. Also, a 17-bit format designated as "s11e5" may be used in accordance with the present invention to preserve 12 bits of information, for consistency and ease of application with programs and users that work with a 12-bit format.

In the present invention, the user can apply the same operation to all of the data in the frame buffer, referred to in the art as Single Instruction at Multiple Data (SIMD). For example, with reference back to FIG. 2, the user may wish to add an image that is coming down the rendering pipeline 130 to an image already stored in the frame buffer 140. The image coming down the pipeline is in floating point format, and thus in the present invention is directly added to the data already stored in the frame buffer that is also in floating point format. The present invention permits the results determined by this operation to be stored in the frame buffer without a loss of precision. Also, in the present invention the permissible range is greater than 1.0, thereby permitting the results from the operation to be stored without being clamped.

With continued reference to FIG. 2, in the present invention the data in the frame buffer 140 are directly operated on within the graphics program without having to pass back through the entire graphics program to establish the required range and precision. For example, it is often necessary to copy the data from the texture memory 137 to the frame buffer 140, then back to the texture memory and back to the frame buffer, and so on until the desired image is reached. In the present invention, such an operation is completed without losing data range and precision, and without the need to pass the data through the entire graphics program 130.

For example, a graphics program in accordance with the present invention can use multipass graphics algorithms such as those that implement lighting or shading programs to modify the frame buffer data that define the appearance of each pixel. The algorithm approximates the degree of lighting or shading, and the component of the data that specifies each of these characteristics is adjusted accordingly. Multiple passes through the shading/lighting program may be needed before the desired effect is achieved. In the present invention, the results of each pass are accumulated in the present invention frame buffer, and then used for the basis for subsequent passes, without a loss of precision or range. Such an operation requires the use of floating point formats in the frame buffer to increase the speed and accuracy of the calculations.

Also, in the present invention the user of the graphics program is able to enhance a portion of data contained within the frame buffer. For example, such an application will arise when the data loaded into the frame buffer represent an image obtained by a device capable of recording images that will not be visible to the human eye when displayed, such as an image recorded by a video camera in very low light, or an infrared image. The present invention is capable of storing such data in the frame buffer because of the range and precision permitted by the floating point format. The user specifies a lower threshold for that component of the data representing how bright the pixel will be displayed to the viewer. Data falling below the specified threshold are then operated on to enhance them; that is, for each piece of data below the threshold, the component of the data representing brightness is increased by addition, until the brightness is increased sufficiently so that the displayed image can be seen by the human eye. Such an operation is possible because of the precision of the data stored in the frame buffer in the present invention. Other operations involving the manipulation of the data in the frame buffer are also possible using the present invention.

Therefore, in the present invention the data are read from the frame buffer, operated on, then written back into the frame buffer. The use of a floating point frame buffer permits operation on the data stored in the frame buffer without a loss of range and precision. The floating point format is specified to optimize the range and precision required for the desired application. The present invention also allows the data stored in the frame buffer to be operated on and changed without the effort and time needed to process the data through the graphics program 130 of FIG. 2. As such, the present invention will increase the speed at which operations can be performed, because it is not necessary to perform all the steps of a graphics program to adequately modify the data in the frame buffer. In addition, processing speed is further improved by applying hardware such as processor chips and computer hard drives to work directly on the frame buffer. Thus, application of the present invention provides the foundation upon which related hardware design improvements can be based, which could not be otherwise utilized.

Figure 4:
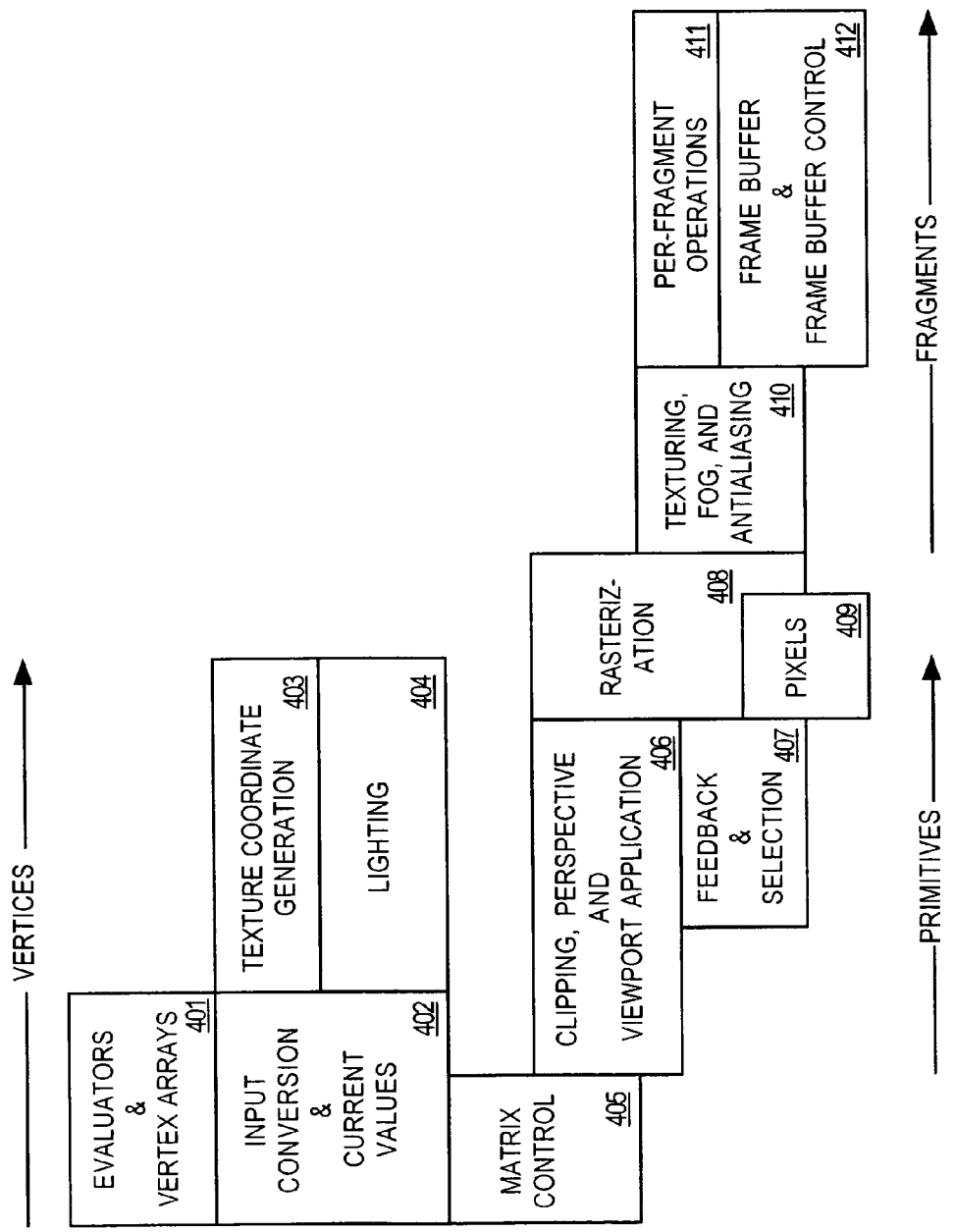
FIG. 4 shows a block diagram of the currently preferred embodiment of the display system.

Referring now to FIG. 4, a block diagram of the currently preferred embodiment of the display system 400 is shown. Display system 400 operates on vertices, primitives, and fragments. It includes an evaluator 401, which is used to provide a way to specify points on a curve or surface (or part of a surface) using only the control points. The curve or surface can then be rendered at any precision. In addition, normal vectors can be calculated for surfaces automatically. The points generated by an evaluator can be used to draw dots where the surface would be, to draw a wireframe version of the surface, or to draw a fully lighted, shaded, and even textured version. The values and vectors associated with evaluator and vertex arrays 401 are specified in a floating point format. The vertex array contains a block of vertex data which are stored in an array and then used to specify multiple geometric primitives through the execution of a single command. The vertex data, such as vertex coordinates, texture coordinates, surface normals, RGBA colors, and color indices are processed and stored in the vertex arrays in a floating point format. These values are then converted and current values are provided by block 402. The texture coordinates are generated in block 403. The lighting process which computes the color of a vertex based on current lights, material properties, and lighting-model modes is performed in block 404. In the currently preferred embodiment, the lighting is done on a per pixel basis, and the result is a floating point color value. The various matrices are controlled by matrix control block 405.

Block 406 contains the clipping, perspective, and viewport application. Clipping refers to the elimination of the portion of a geometric primitive that is outside the half-space defined by a clipping plane. The clipping algorithm operates on floating point values. Perspective projection is used to perform foreshortening so that the farther an object is from the viewport, the smaller it appears in the final image. This occurs because the viewing volume for a perspective projection is a frustum of a pyramid. The matrix for a perspective-view frustum is defined by floating point parameters. Selection and feedback modes are provided in block 407. Selection is a mode of operation that automatically informs the user which objects are drawn inside a specified region of a window. This mechanism is used to determine which object within the region a user is specifying or picking with the cursor. In feedback mode, the graphics hardware is used to perform the usual rendering calculations. Instead of using the calculated results to draw an image on the screen, however, this drawing information is returned. Both feedback and selection modes support the floating point format.

The actual rasterization is performed in block 408. Rasterization refers to converting a projected point, line, or polygon, or the pixels of a bitmap or image, to fragments, each corresponding to a pixel in the frame buffer 412. Note that all primitives are rasterized. This rasterization process is performed exclusively in a floating point format. Pixel information is stored in block 409. A single pixel (x,y) refers to the bits at location (x,y) of all the bitplanes in the frame buffer 412. The pixels are all in floating point format. A single block 410 is used to accomplish texturing, fog, and antialiasing. Texturing refers to the process of applying an image (i.e., the texture) to a primitive. Texture mapping, texels, texture values, texture matrix, and texture transformation are all specified and performed in floating point. The rendering technique known as fog, which is used to simulate atmospheric effects (e.g., haze, fog, and smog), is performed by fading object colors in floating point to a background floating point color value(s) based on the distance from the viewer. Antialiasing is a rendering technique that assigns floating point pixel colors based on the fraction of the pixel's area that is covered by the primitive being rendered. Antialiased rendering reduces or eliminates the jaggies that result from aliased rendering. In the currently preferred embodiment, blending is used to reduce two floating point color components to one floating point color component. This is accomplished by performing a linear interpolation between the two floating point color components. The resulting floating point values are stored in frame buffer 412. But before the floating point values are actually stored into the frame buffer 412, a series of operations are performed by per-fragment operations block 411 that may alter or even throw out fragments. All these operations can be enabled or disabled. It should be noted that although many of these blocks are described above in terms of floating point, one or several of these blocks can be performed in fixed point without departing from the scope of the present invention. The blocks of particular interest with respect to floating point include the rasterization 408; pixels 409; texturing, fog, and antialiasing 410; per-fragment operations 411; and frame buffer and frame buffer control 412 blocks.

Figure 5A:
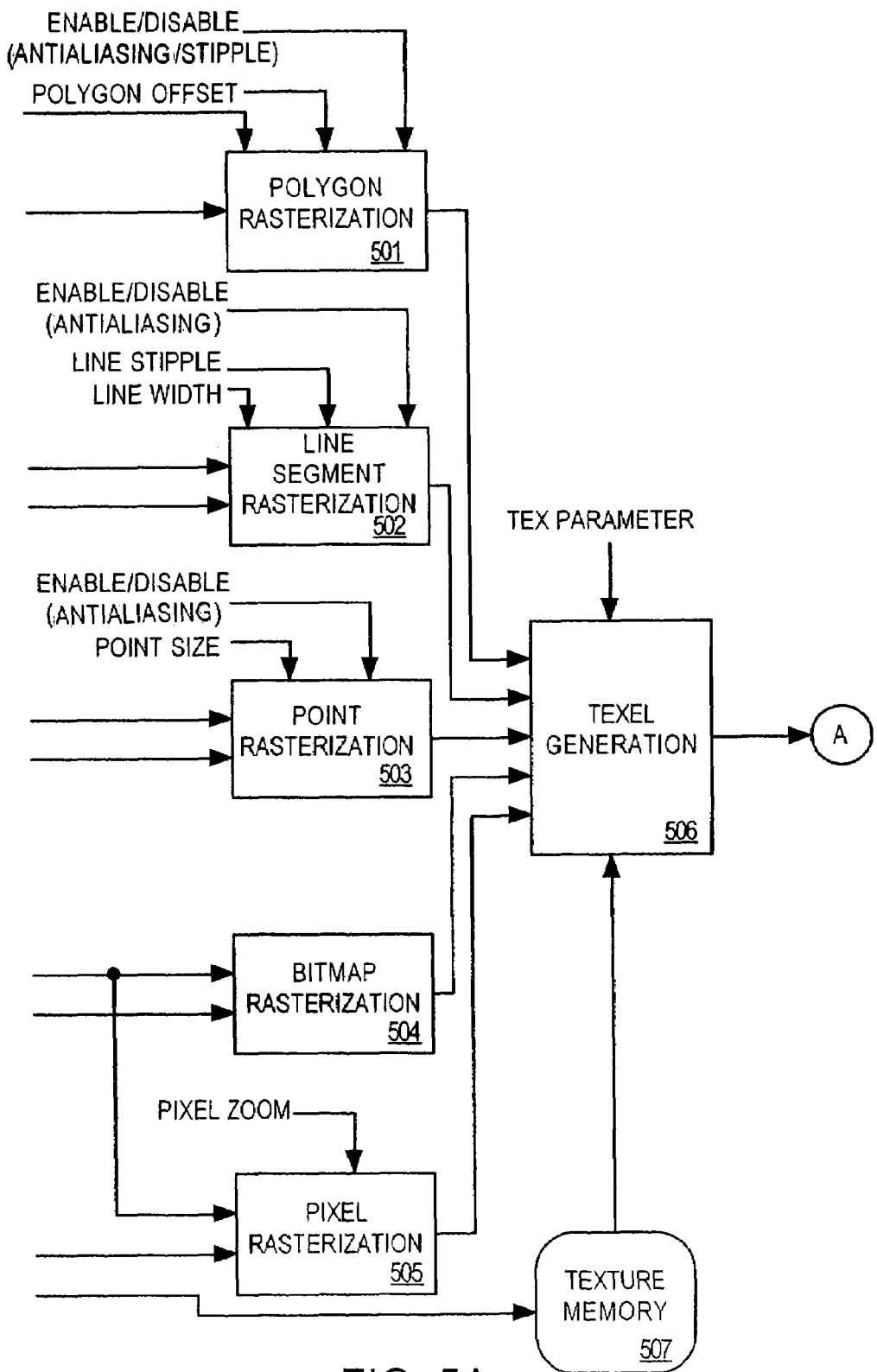
FIGS. 5A, 5B, and 5C, shows a more detailed layout of a display system for implementing the floating point present invention.
Figure 5B:
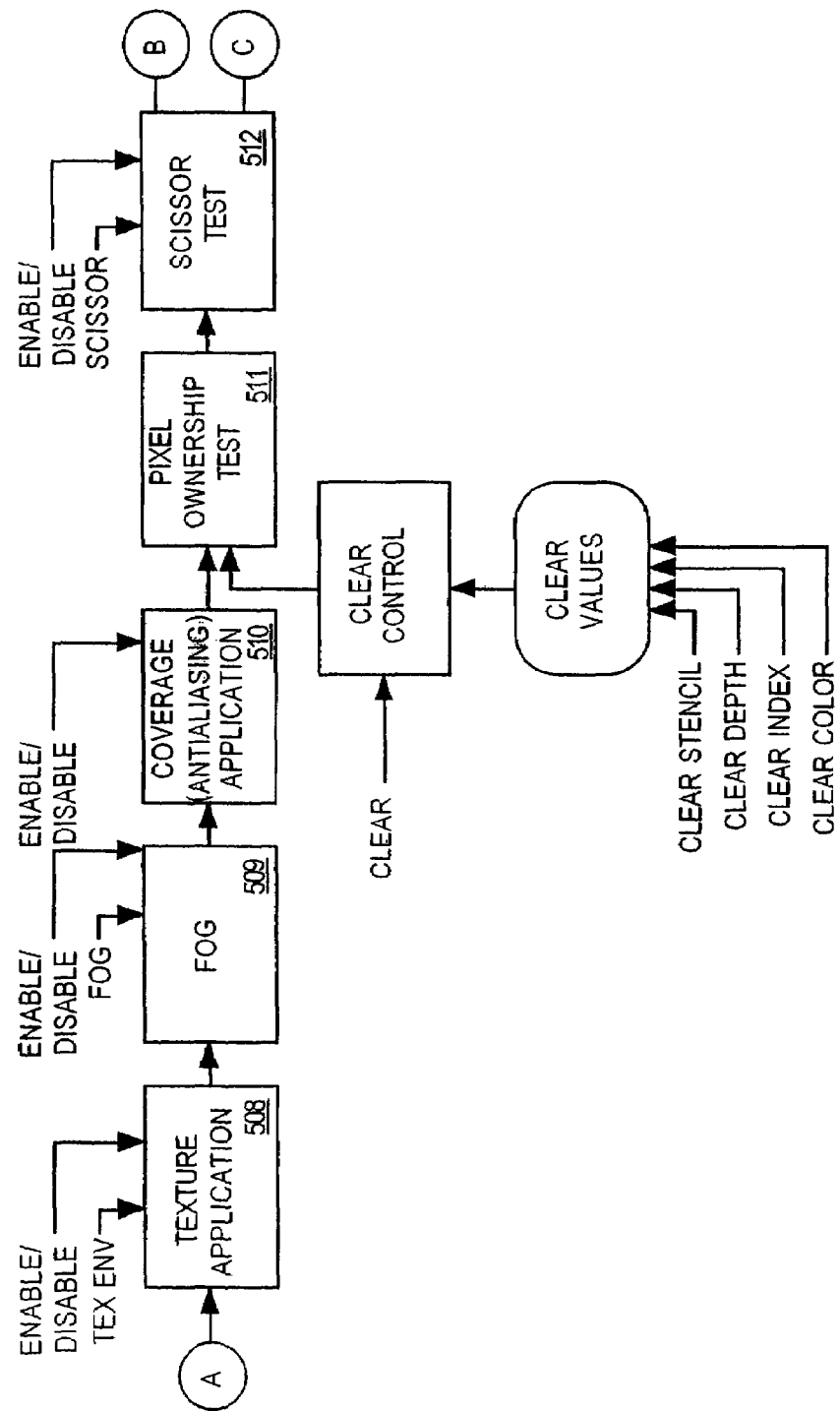
Figure 5C:
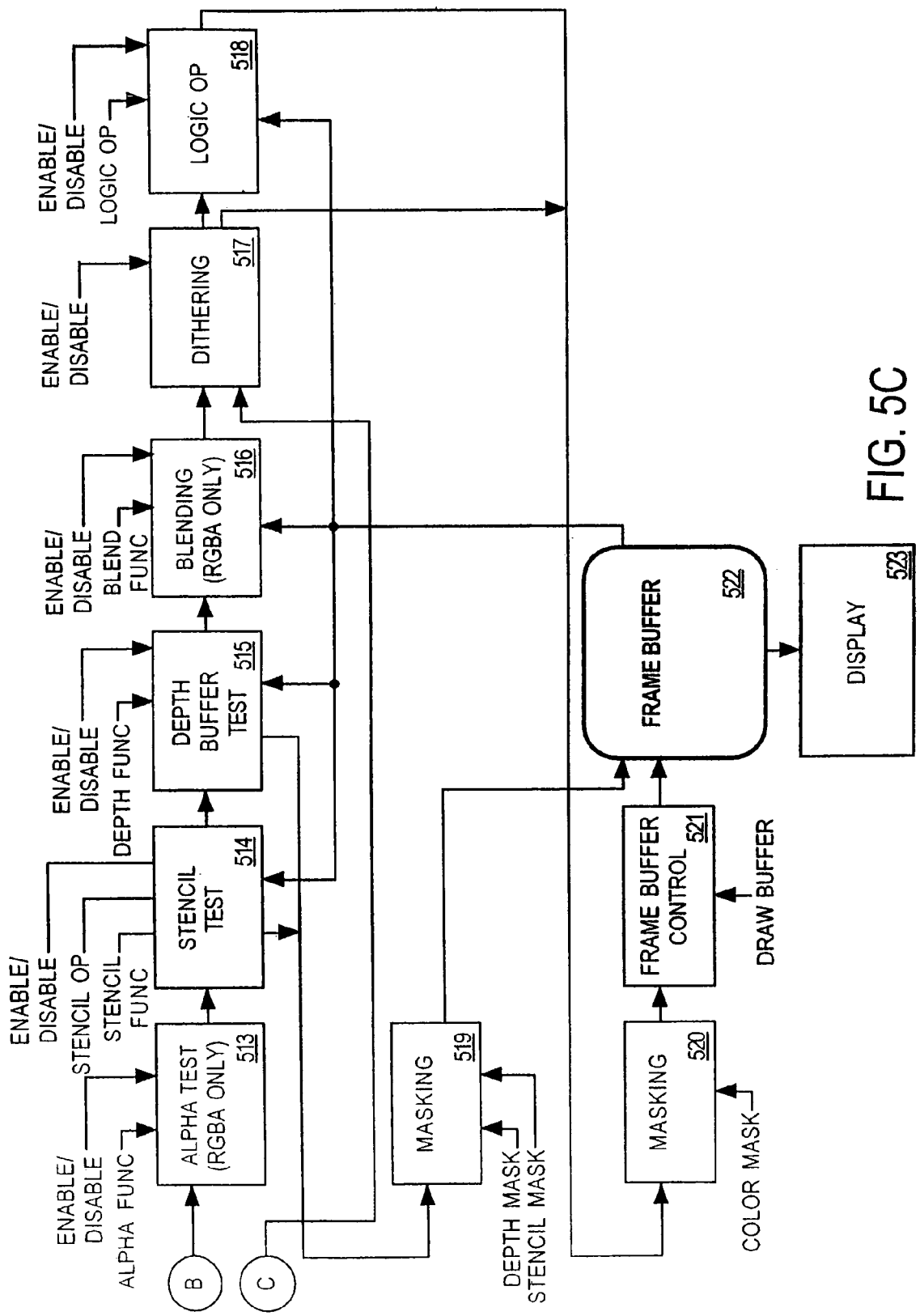

FIG. 5 shows a more detailed layout of a display system for implementing the floating point present invention. In the layout, the process flows from left to right. Graphics commands, vertex information, and pixel data generated by previous circuits are input to the polygon rasterization 501, line segment rasterization 502, point rasterization 503, bitmap rasterization 504, and pixel rasterization 505. Floating point format can be applied to any and/or all of these five rasterization functions. In particular, the polygons are rasterized according to floating point values. The outputs from these five blocks 501-505 are all fed into the texel generation block 506. In addition, texture data stored in texture memory 507 is also input to texel generation block 506. The texture data is stored in the texture memory 507 in a floating point format. Texel values are specified in a floating point format. The texel data is then applied to the texture application block 508. Thereupon, fog effects are produced by fog block 509. Fog is achieved by fading floating point object colors to a floating point background color. A coverage application 510 is used to provide antialiasing. The antialiasing algorithm operates on floating point pixels colors. Next, several tests are executed. The pixel ownership test 511 decides whether or not a pixel's stencil, depth, index, and color values are to be cleared. The scissor test 512 determines whether a fragment lies within a specified rectangular portion of a window. The alpha test 513 allows a fragment to be accepted or rejected based on its alpha value. The stencil test 514 compares a reference value with the value stored at a pixel in the stencil buffer. Depending on the result of the test, the value in the stencil buffer is modified. A depth buffer test 515 is used to determine whether an incoming depth value is in front of a pre-existing depth value. If the depth test passes, the incoming depth value replaces the depth value already in the depth buffer. Optionally, masking operations 519 and 520 can be applied to data before it is written into the enabled color, depth, or stencil buffers. A bitwise logical AND function is performed with each mask and the corresponding data to be written.

Blending 516 is performed on floating point RGBA values. Color resolution can be improved at the expense of spatial resolution by dithering 517 the color in the image. The final operation on a fragment is the logical operation 518, such as an OR, XOR, or INVERT, which is applied to the incoming fragment values and/or those currently in the color buffer. The resulting floating point values are stored in the frame buffer 522 under control of 521. Eventually, these floating point values are read out and drawn for display on monitor 523. Again, it should be noted that one or more of the above blocks can be implemented in a fixed point format without departing from the scope of the present invention. However, the blocks of particular importance for implementation in a floating point format include the polygon rasterization 501, texel generation 506, texture memory 507, fog 509, blending 516, and frame buffer 522.

In the currently preferred embodiment, the processor for performing geometric calculations, the rasterization circuit, and the frame buffer all reside on a single semiconductor chip. The processor for performing geometric calculations, the rasterization circuit, and the frame buffer can all have the same substrate on that chip. Furthermore, there may be other units and/or circuits which can be incorporated onto this single chip. For instance, portions or the entirety of the functional blocks shown in FIGS. 4 and 5 can be fabricated onto a single semiconductor chip. This reduces pin count, increases bandwidth, consolidates the circuit board area, reduces power consumption, minimizes wiring requirements, and eases timing constraints. In general, the design goal is to combine more components onto a single chip.

The preferred embodiment of the present invention, a floating point frame buffer, is thus described. While the present invention has been described in particular embodiments, it should be appreciated that the present invention should not be construed as limited by such embodiments, but rather construed according to the following claims.

What is claimed is:

1. A computer system, comprising:
    a processor for performing geometric calculations on a plurality of vertices of a primitive;
    a rasterization circuit coupled to the processor that rasterizes the primitive according to a scan conversion process which operates using a floating point format; and
    a frame buffer coupled to the rasterization circuit for storing a plurality of color values in the floating point format.

2. The computer system of claim 1 further comprising:
    a texture circuit coupled to the rasterization circuit that applies a texture to the primitive, wherein the texture is specified by floating point values; and
    a texture memory coupled to the texture circuit that stores a plurality of textures in floating point values.

3. The computer system of claim 1, wherein the floating point format is comprised of sixteen bits.

4. The computer system of claim 3, wherein the floating point format is comprised of an s10e5 format.

5. The computer system of claim 1 further comprising a lighting circuit coupled to the rasterization circuit for performing a lighting function, wherein the lighting function executes on floating point values.

6. The computer system of claim 1 further comprising a fog circuit coupled to the rasterization circuit for performing a fog function, wherein the fog function operates on floating point values.

7. The computer system of claim 1 further comprising an antialiasing circuit coupled to the rasterization circuit which performs an antialiasing algorithm according to floating point values.

8. The computer system of claim 1 further comprising a blender coupled to the rasterization circuit which blends floating point values.

9. The computer system of claim 1 further comprising logic coupled to the rasterization circuit which performs per-fragment operations on floating point values.

10. The computer system of claim 1, wherein the processor, the rasterization circuit, and the frame buffer are on a single semiconductor chip.

11. The computer system of claim 10, wherein the processor, the rasterization circuit, and the frame buffer reside on a same substrate of the single semiconductor chip.

12. The computer system of claim 1 further comprising:
a display screen coupled to the frame buffer for receiving the plurality of color values read out from the frame buffer in the floating point format and displaying an image according to the plurality of color values.

13. The computer system of claim 1 further comprising:
an electrical connector for forwarding floating point color values from the frame buffer to a display screen.

14. In a computer system, a method for operating on data stored in a frame buffer, comprised of:
a) scan converting the data in a floating point format to produce floating point scan converted data;
b) storing the floating point scan converted data in the frame buffer in the floating point format;
c) reading the floating point scan converted data from the frame buffer;
d) operating directly on the floating point scan converted data in the floating point format to produce color data in the floating point format; and
e) writing the floating point color data to the frame buffer in the floating point format.

15. The method of claim 14, wherein the steps of writing, storing, and reading are further comprised of specifying the floating point format according to a specification, wherein the specification corresponds to a level of range and precision.

16. The method of claim 15 wherein the specification is comprised of 16 bits of data and the data are comprised of one sign bit, ten mantissa bits, and five exponent bits.

17. The method of claim 15 wherein the specification is comprised of 17 bits of data and the data are comprised of one sign bit, 11 mantissa bits, and five exponent bits.

18. The method of claim 15 wherein the specification is comprised of 16 bits of data and the data are comprised of ten mantissa bits and six exponent bits.

19. The method of claim 15 wherein the specification is comprised of 32 bits of data and the data are comprised of one sign bit, 23 mantissa bits, and eight exponent bits.

20. A computer system comprising:
a raster subsystem for performing a rasterization process, the rasterization process performed in a floating point format; and
a floating point frame buffer coupled to the raster subsystem for storing a plurality of floating point color values, wherein the floating point color values are read out from the frame buffer in the floating point format for display.

21. The computer system of claim 20, wherein the floating point color values are written to the frame buffer.

22. The computer system of claim 20, wherein the floating point color values are read from the frame buffer for graphics processing.

23. The computer system of claim 20, wherein the floating point color values are written to, read from, and stored in the frame buffer using a specification of the floating point color values that corresponds to a level of range and precision.

24. The computer system of claim 23, wherein the floating point color values are comprised of 16 bits of data and the data are comprised of one sign bit, ten mantissa bits, and five exponent bits.

25. The computer system of claim 23, wherein the floating point color values are comprised of 17 bits of data and the data are comprised of one sign bit, 11 mantissa bits, and five exponent bits.

26. The computer system of claim 20 wherein the raster subsystem performs a scan conversion process in a floating point format.

27. A rendering pipeline, comprising:
a processor for performing geometric calculations on a plurality of vertices of a primitive;
a rasterization module coupled to the processor that rasterizes the primitive according to a scan conversion process which operates using a floating point format; and
a frame buffer coupled to the rasterization module for storing a plurality of color values in the floating point format.

28. The rendering pipeline of claim 27, further comprising:
a texture module coupled to the rasterization module that applies a texture to the primitive, wherein the texture is specified by floating point values; and
a texture memory coupled to the texture module that stores a plurality of textures in floating point values.

29. The rendering pipeline of claim 27, wherein the floating point format is comprised of sixteen bits.

30. The rendering pipeline of claim 29, wherein the floating point format is comprised of an s10e5 format.

31. The rendering pipeline of claim 27, further comprising a lighting module coupled to the rasterization module for performing a lighting function, wherein the lighting function executes on floating point values.

32. The rendering pipeline of claim 27, further comprising a fog module coupled to the rasterization module for performing a fog function, wherein the fog function operates on floating point values.

33. The rendering pipeline of claim 27, further comprising an antialiasing module coupled to the rasterization module which performs an antialiasing algorithm according to floating point values.

34. The rendering pipeline of claim 27, further comprising a blender coupled to the rasterization module which blends floating point values.

35. The rendering pipeline of claim 27, further comprising logic coupled to the rasterization module which performs per-fragment operations on floating point values.

36. The rendering pipeline of claim 27, wherein the processor, the rasterization module, and the frame buffer are on a single semiconductor chip.

37. The rendering pipeline of claim 36, wherein the processor, the rasterization module, and the frame buffer reside on a same substrate of the single semiconductor chip.

38. The rendering pipeline of claim 27 further comprising:
a display screen coupled to the frame buffer for receiving the plurality of color values read out from the frame buffer in the floating point format and displaying an image according to the plurality of color values.

39. The rendering pipeline of claim 27 further comprising:
an electrical connector for forwarding floating point color values from the frame buffer to a display screen.

* * * * *